Jan. 27, 1959 F. H. TENNIS 2,870,781
RELIEF VALVE
Filed June 22, 1956 2 Sheets-Sheet 1

Inventor
Francis H. Tennis

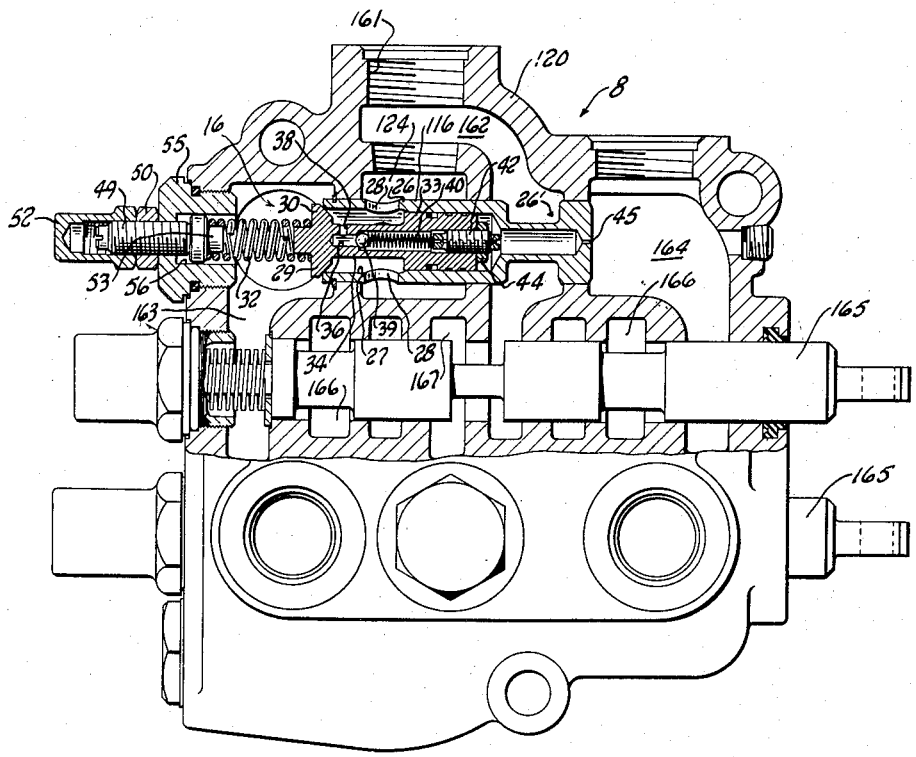

United States Patent Office 2,870,781
Patented Jan. 27, 1959

2,870,781

RELIEF VALVE

Francis H. Tennis, Milwaukee, Wis., assignor to Hydraulic Unit Specialties Co., Waukesha, Wis., a corporation of Wisconsin Application June 22, 1956, Serial No. 593,166

1 Claim. (Cl. 137—490)

This invention relates to pressure relief valves for hydraulic equipment and the like, and has for its principal object the provision of a relief valve which does not "crack" to a partially open position at pressure values substantially below the predetermined pressure at which the valve is intended to open.

The conventional pressure relief valve heretofore used with hydraulic apparatus to protect the same against excessive pressures comprised a body defining a chamber having an inlet and an outlet, with a valve seat on the body surrounding the chamber outlet and against which a valve element was normally seated to prevent fluid entering the chamber via the inlet from flowing out of the outlet. The pressure of fluid in the chamber exerted a force directly upon the valve element in a direction to unseat the same, and this force was resisted, up to a point, by adjustable spring means biasing the valve element to its seated position. When the force exerted upon the valve element by fluid in the chamber exceeded the force exerted thereon by the spring, the valve element was of course moved off the seat, permitting fluid to be freely exhausted from the chamber.

The relief valves of this type heretofore known have generally had an objectionable characteristic arising from the fact that the yielding displacement of a spring is always directly proportional to the load imposed thereon. If the spring was adjusted to cause opening of the valve at some predetermined safe value, the spring would begin to yield and the valve would "crack" or open slightly at some fluid pressure below that value. There was thus a very substantial difference between the pressure value at which "cracking" began and that at which substantially full opening of the relief valve took place, and as pressures built up through this range of values the available flow output from the pump was more and more reduced, even though the pressure had not reached a maximum safe limit, and a considerable waste of power resulted. But if the spring tension was increased so as to prevent such cracking below the desired relief value, then full opening of the valve to relieve excessive pressure would not occur until the fluid pressure had substantially exceeded the predetermined safe value.

Normally some adjustment must be provided by which the valve biasing spring of a relief valve may be preset to provide for opening of the valve at different pressure values. It frequently happened that an operator of a hydraulic system, unfamiliar with the tendency of a relief valve to "crack," would set the spring tension at an excessively high value, so that the relief valve would not open sufficiently to relieve fluid pressure until the pressure had reached a dangerously high level, and as a result the hydraulically actuated mechanism, the pump, or both, might be damaged, just as if no relief valve had been provided in the system. Of course the provision of a readily accessible adjusting means also gave rise to other abuses, such as missetting the valve to relieve at an extremely low pressure, resulting in unsatisfactory operation of the hydraulic unit and considerable waste of power.

With these objections to past relief valve devices in mind, it is an object of the present invention to provide a relief valve for fluid pressure operated systems wherein the valve element which opens to permit bypassing of fluid around the device to be actuated remains shut until substantially a predetermined pressure is attained, and then opens to the full extent necessary to bypass fluid to an exhaust or return duct at a rate to maintain the pressure at such predetermined pressure; and wherein there is only negligible difference between the pressure at which the valve "cracks" and that at which it is fully open, to permit utilization of the maximum safe operating pressure developed by the pump for the system, thus avoiding waste of the power required to drive the pump.

Another major object of this invention resides in the provision of a relief valve wherein the principal pressure adjustment is normally inaccessible, and wherein abuse or mis-setting of an accessible secondary adjustment cannot so greatly alter the operating characteristics of the valve as to defeat its purpose, render it inoperative, or seriously affect the operation of the hydraulic system in which the relief valve is installed.

A further object of this invention resides in the provision of a compact, inexpensive and dependable relief valve of the character described having a poppet valve incorporating a pilot relief valve therein whereby operation of the poppet valve is controlled, and which pilot valve comprises a unitary subassembly with the poppet.

Still another object of this invention resides in the provision of a relief valve which attains the foregoing stated objects and which, in addition, is extremely quiet in operation, because it opens and closes with a substantially damped motion, but which is nevertheless easy to assemble and disassemble, and which, by reason of its compactness and other advantageous features, lends itself to incorporation into a hydraulic control unit comprising other valves of various kinds.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 4 is a view partly in longitudinal section and partly in side elevation of a control unit for a hydraulic device incorporating a relief valve of this invention.

Figure 1:
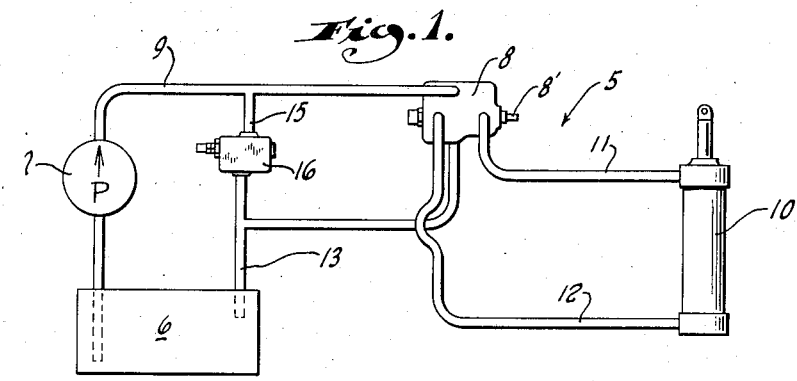
Figure 1 is a schematic diagram of a hydraulic system incorporating a relief valve embodying the principles of this invention.

Referring now to the accompanying drawings, in which like numerals designate like parts throughout the several views, the numeral 5 designates generally a typical hydraulic system comprising a fluid reservoir 6 from which hydraulic fluid may be drawn by means of a pump 7 which pumps the fluid under pressure to a control or selector valve 8 by way of a duct 9, and thence to a hydraulically actuated device, in this case shown as a double acting hydraulic jack 10. The selector includes manually actuatable valve means 8' whereby fluid entering the selector under pump pressure may be fed to either of two ducts 11, 12 which communicate with the opposite ends of the jack cylinder. Thus, if fluid pressure is connected with duct 12 through the selector valve, the jack is extended, and return fluid from the jack flows through duct 11 and, via the selector and an exhaust duct 13, back to the reservoir. In another operative position of the selector valve, pressure may be directed through the duct 11 to retract the jack while exhaust fluid is returned to the reservoir through duct 12, the selector, and return duct 13. When the selector is placed in a neutral position it directs fluid from the pump directly into return duct 13.

In any operative position of the selector valve an excessive pressure may be built up in the pump outlet for any of a number of reasons, and such pressure could result in damage to the pump. To relieve such excessive pressure, should it develop, a bypass duct 15 is provided, connecting the pump outlet directly with the return duct 13, and a relief valve 16 of this invention is interposed in the bypass duct which prevents flow of fluid through said bypass duct at times when pressure is within allowable limits but permits flow through the bypass duct when fluid pressure exceeds a predetermined safe value.

Figure 2:
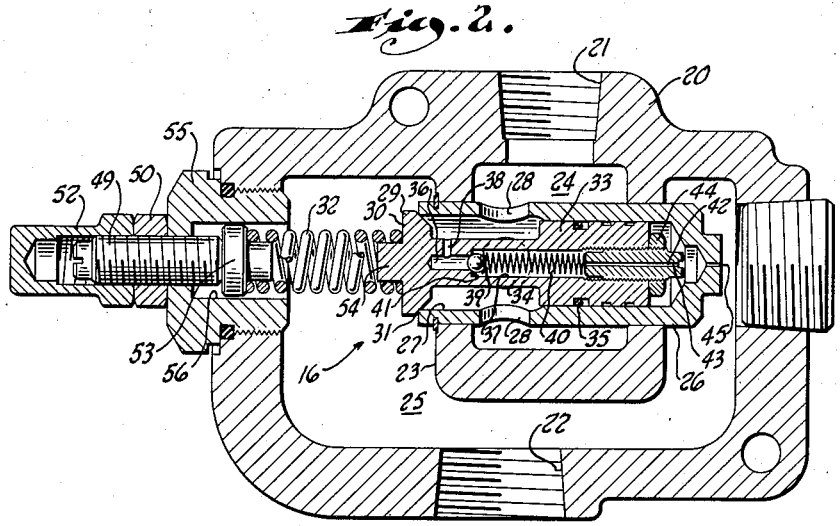
Figure 2 is a longitudinal sectional view of a relief valve of this invention.

As best seen from Figure 2, the relief valve of this invention comprises a housing 20 defining a chamber having top and bottom inlet and outlet ports 21 and 22 respectively, which may be internally threaded to provide for connection of the relief valve in the bypass duct 15. A substantially U-shaped partition wall 23 extending entirely across the housing divides its interior into an inlet compartment 24 communicating with the inlet 21 and an outlet compartment 25 externally of the partition, and precludes flow of fluid from the inlet port 21 to the outlet port 22 except through the relief valve per se. The relief valve mechanism comprises a substantially cylindrical body 26 supported by the partition wall 23 with its medial portion spanning the inlet compartment and with its opposite ends projecting through the upright legs of the partition into the outlet compartment.

The valve body has a well 27 therein the mouth of which opens to the front end thereof, and has inlet ports 28 in its side wall which communicate the inlet compartment in the housing with the well in the valve body. Thus fluid entering the inlet compartment can flow into the valve body, and it would flow out of the mouth of the well into the outlet compartment if it were not normally prevented from doing so by a poppet valve 29 having its head 30 engageable with an outwardly facing annular seat 31 on the body adjacent to the mouth of the well and normally biased into engagement with the valve seat by means of a compression return spring 32.

Inwardly of the ports 28, the well in the body is preferably reduced in diameter to slidingly receive an inner stem portion 33 on the poppet valve of a size to provide a snug sliding fit in the well, and which thus constitutes a piston, and an outer reduced stem portion 34 rigidly connects the piston with the valve head. The piston is at all times disposed in the inner, smaller diameter portion of the well, at the side of the inlet ports 28 remote from the valve seat, and, through the reduced outer portion of the stem, the piston carries the valve head and guides it for axial motion toward and from engagement with the seat. An O-ring 35 confined in a circumferential groove in the piston insures a good seal between the piston and the wall of the well.

Because of the differences in diameters of the front and rear portions of the well in the valve body, the underside of the valve head presents a surface of greater area to the inlet ports than does the front end of the piston 33. Consequently, fluid under pressure entering the well through ports 28 will always extert unbalanced forces on the poppet valve 29 tending to unseat the poppet valve. Since the force tending to unseat the valve is normally substantially small, however, the spring 32 may be relatively light, for the force which it exerts on the valve head need only be great enough to overcome the normal pressure differential tending to unseat the main poppet valve.

In the valve stem is an axial passage extending from near the head 30 to the rear of the stem. The forward portion of this passage is provided by a bore 36, and the rear portion of the passage is provided by a counterbore 37 opening to the rear of the piston 33. The forward end of this passage communicates with the well through a radial branch 38 in the reduced outer portion of the stem, so that fluid entering the well can flow behind the piston through the passage. Normally, however, such flow of fluid is blocked by a pilot valve in the passage comprising a small ball 39 which is biased forwardly, by means of a compression spring 40, into sealing engagement with a rearwardly facing valve seat 41 formed at the junction of the bore 36 and counterbore 37. An adjusting screw 42 having a small diameter axial bore 43 therethrough is threaded into the counterbored rear portion of the piston, and the compression spring 40 reacts between this screw and the ball 39 with a force dependent upon the position of axial adjustment of the screw in the piston. A lock nut 44 on the projecting rear of the adjusting screw engages the rear of the piston to hold the adjusting screw in its desired position of adjustment.

When the pressure of the fluid entering the inlet ports 28 in the body exceeds a predetermined value, established by the setting of the adjusting screw 42, the ball will be thereby forced off its seat and fluid will flow into the space behind the piston, through the passages 36, 37, and 43 exerting a forward unseating force against the rear of the piston by which positive unseating movement of the poppet valve will be effected.

A bleed port 45 in the valve body, communicating the bottom of the well with the outlet compartment of the housing, allows the exhaust of fluid from the well during closure of the valve, and affords a dash-pot effect which brings about smooth, noiseless closure of the poppet valve when the pilot valve closes in response to a reduction in fluid pressure below its predetermined opening value, since the poppet valve cannot slam shut under the influence of its return spring 32 but must move toward its seated position gradually as the fluid behind the piston is bled off through the bleed port. Those skilled in the art will readily appreciate that the bleed port 45 should be smaller in diameter than any of the passages 36, 37 and 43 through the piston and its stem.

Figure 3:
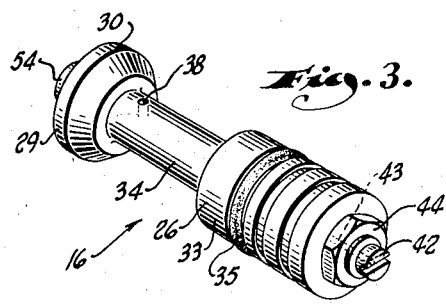
Figure 3 is a perspective view of the subassembly comprising the poppet and pilot valves.

Attention is directed to the fact that the entire pilot relief valve mechanism constitutes a unitary subassembly in the poppet valve (see Figure 3), and that when the poppet valve is assembled into the valve body the projecting end portion of the adjusting screw is located in the bottom of the well, where it is inaccessible to unauthorized tampering. The compression spring 32 merely serves to return the poppet valve to its seated position after it has beeen displaced by excessive fluid pressure, and it may be provided with a limited range of adjustability by having its end remote from the poppet valve seated against an adjusting screw 49 which projects to the exterior of the housing to be more readily accessible for adjustment. A locking nut 50 and a threaded cap 52 on the outer end of the screw 49 discourage unauthorized tampering. A pilot 53 is preferably interposed between the adjusting screw and the forward end of the spring, and the rear of the spring encircles a pilot 54 on the head of the poppet to retain the return spring against lateral displacement out of its operative position. The adjusting screw 49 is also preferably threaded in a hollow plug 55 removably threaded into the housing to facilitate removal of the poppet from the housing for servicing and/or adjustment of the pilot valve, and this plug has an inwardly opening counterbore 56 in which the pilot 53 and the outer end portion of the return spring are received to further steady the spring.

As stated previously, the inner portion of the well 27 in the valve body has a slightly smaller diameter than its outer portion, and consequently fluid in the well at all times tends to exert a very slight unseating force upon the poppet valve. This is an important feature since it assures instantaneous opening of the main poppet valve as a consequence of sudden shock pressure conditions which may develop pressures in the system having a value far greater than that of the relief setting of the valve. If it were not for the condition of unbalance which at all times tends to unseat the main poppet valve, the inherent lag in the pilot produced opening of the valve under the influence of such shock conditions would preclude opening of the main poppet in time to prevent damage to the hydraulic pump or other equipment forming part of the hydraulic system.

The lag or time delay in pilot produced opening of the main poppet 29 results from the fact that hydraulic fluid must flow through the substantially restricted passages 38, 36 and 37 and the more restricted passage 43 in order to reach the space behind the piston. It will be appreciated that although the pilot poppet 39 is pressure responsive, the pilot mechanism governed thereby is flow responsive, and that in its normal operation the main poppet 29 is unseated by the pilot mechanism as a consequence of the flow of hydraulic fluid through the passage 43 and into the space behind the piston at a rate in excess of a predetermined value, namely faster than it can escape out of said space through the bleed passage 45. This flow responsive operation of the pilot mechanism accounts for the smooth but positive opening of the main poppet 29.

During any more or less gradual pressure rises to the relief setting of the unit, the force of the spring 32 is sufficient to overcome the force acting directly on the underside of the main poppet tending to unseat it. However, when sudden shock pressure conditions develop pressures which may greatly exceed the relief setting of the valve, the flow of fluid through the restricted passages of the pilot mechanism and into the space behind the piston would take an excessive amount of time, and the poppet 29 would not be unseated quickly enough to afford protection to the hydraulic pump or other apparatus in the system controlled by the valve. At such times the force which fluid exerts directly on the main poppet tending to unseat it will also greatly exceed the opposing force of the spring 32, and the main poppet will be immediately opened in response thereto, without waiting for the slower response of the pilot mechanism to flow of fluid into the space behind the piston.

In the embodiment of the invention shown in Figure 4 the relief valve of this invention is shown incorporated in the hydraulic control or selector valve itself. The valve unit therein shown is similar to that described in my copending application Serial No. 518,296, filed June 27, 1955.

The housing 120 of this unit has an inlet 161 at its top leading to an inlet passage 162 in the interior of the housing, and also has in its interior a substantially U-shaped exhaust passage, only the upright legs 163 and 164 of which are shown. Manually actuatable spool valves 165 are operable to direct fluid under pressure which enters the inlet passage 162 to either of a pair of outlet passages 166 while simultaneously permitting return fluid to flow from the other outlet passage to the exhaust passage. In a neutral position such as shown, the valves block flow of fluid from the inlet to both outlet passages and direct it to the exhaust passage via a through passage 167.

The relief valve 116 of this invention is mounted in the upper portion of the control unit housing, with the medial portion of its body 26 spanning a fluid pressure chamber 124 which is in open communication with the inlet passage. The forward end of the body projects into the adjacent leg 163 of the exhaust passage, while an extension 26' on the rear of the body projects through the remote wall of the inlet passage and into the other leg 164 of the exhaust passage. The relief valve as built into the control unit in all other respects follows the construction and operation of that previously described, and Figure 4 thus illustrates how the relief valve of this invention, by reason of its compact construction, lends itself readily to incorporation into hydraulic control units of many types.

From the foregoing description taken together with the accompanying drawings it will be apparent that this invention provides a compact and inexpensive pressure relief valve which is quiet and dependable in operation, which does not permit substantial bypass flow of fluid to occur at pressure values below that at which the valve is set to relieve, and which is substantially tamper proof in that its principal adjustment is normally inaccessible when the valve is assembled.

What is claimed as my invention is:

A relief valve comprising: a body having a bore opening to its front through a counterbore and having a forwardly facing annular valve seat thereon adjacent to the mouth of the counterbore and larger in diameter than said bore, said body having an inlet communicable with a source of fluid under pressure and opening into said counterbore, inwardly of the valve seat; a main poppet valve having a head normally engaging the valve seat and thereby closing the mouth of the counterbore, an inner stem portion providing a piston slidingly received in the bore and sealing off the counterbore from that portion of the bore which is behind the piston, and a reduced outer stem portion rigidly connecting the piston and the head, the head and piston having surfaces which are spaced apart and oppose one another and the area of said surface on the head being greater than that of said surface on the piston whereby normal fluid pressure in the counterbore causes a force to be exerted upon the head tending to unseat the main poppet valve; spring means biasing the main poppet valve onto its seat with a force sufficient to overcome the unseating force exerted upon the valve head by normal fluid pressure in the counterbore, said spring means being yieldable to permit instantaneous unseating of the main poppet valve in response to the direct application to said surface thereon of forces in excess of said biasing force tending to hold the main poppet valve seated and which forces may be produced by abrupt above normal pressure pulsations in the counterbore; and pilot relief valve mechanism for effecting unseating of the main poppet valve whenever the pressure of fluid entering the counterbore builds up less abruptly beyond normal, said pilot relief valve mechanism comprising restricted passage means communicating the body inlet with the bore rearwardly of said piston, and a pilot poppet valve in said passage means biased to a position closing the passage means but arranged to open whenever fluid pressure at the body inlet exceeds said normal pressure to provide for the flow of such fluid through said passage means and into the bore behind the piston where it can exert a forward unseating force upon the piston and the main poppet valve connected therewith to overcome the biasing force tending to hold the latter closed, and thus effect unseating of the main poppet valve to allow fluid entering the counterbore to flow out of the mouth of the counterbore; and means in the body providing a restricted bleed outlet from the body, communicating with the bore rearwardly of the piston therein, and through which fluid behind the piston may be exhausted from the body during seating of the main poppet valve.

References Cited in the file of this patent

UNITED STATES PATENTS

| | | |
|---|---|---|
| 591,014 | Schreidt | Oct. 5, 1897 |
| 2,587,161 | Huber | Feb. 26, 1952 |
| 2,667,893 | Kupiec | Feb. 2, 1954 |
| 2,744,538 | Stevenson | May 8, 1956 |